United States Patent

[11] 3,614,291

| [72] | Inventor | John Pullen |
| | | Wilton, Conn. |
| [21] | Appl. No. | 850,191 |
| [22] | Filed | Aug. 14, 1969 |
| [45] | Patented | Oct. 19, 1971 |
| [73] | Assignee | Burndy Corporation |

[54] TRANSMISSION LINE CABLE DAMPER
12 Claims, 4 Drawing Figs.

[52] U.S. Cl. .................................................. 174/42,
188/1 B
[51] Int. Cl. .................................................. H02g 7/14,
F16f 7/10
[50] Field of Search ..................................... 174/42;
188/1 B, 103

[56] References Cited
UNITED STATES PATENTS
2,132,319  10/1938  Preiswerk ................ 188/1 B UX
3,085,657  4/1963  Preis ........................ 188/1 B
3,185,255  5/1965  Bird .......................... 188/1 B
FOREIGN PATENTS
893,185  6/1944  France ..................... 174/42
362,004  12/1931  Great Britain ............ 174/42

Primary Examiner—Duane A. Reger
Attorney—Howard S. Reiter

ABSTRACT: A damper for transmission line cables utilizes an outer body formed of concrete, and having an internal opening that functions as the cylinder of a fluid containing dashpot. A piston in the dashpot cylinder supports the weight of the concrete body through the intermediary of a spring in the cylinder, and a piston rod is fixed to the piston and extends out of the concrete body to be secured to a cable whose motion is to be damped. In a modification, the subassembly of a dashpot comprising a piston and piston rod, a spring and a fluid containing cylinder, is inserted into an opening of a weight mass formed of concrete, and the cylinder becomes an integral part of said weight mass.

PATENTED OCT 19 1971

TRANSMISSION LINE CABLE DAMPER

FIELD OF INVENTION

This invention relates to a vibration inhibitor or damper, such as is used in connection with overhead transmission line cables.

PRIOR ART

While many inventors have worked in this art and have contributed numerous constructions, so far as I know, there is not today in existence a truly effective damper for transmission line cables, that may be manufactured effectively and inexpensively.

In general, a vibration inhibitor or damper requires the use of a relatively substantial weight that is supported by means fixed to the transmission line cable, through the intermediary of a spring. Movement between the cable and the spring supported weight, as the transmission line vibrates, is damped through the intermediary of the spring and a liquid dashpot.

In one form of the prior art, a casing or cylinder is secured to the transmission line cable, and within the casing a weight is supported through the intermediary of a spring, with fluid in the casing or cylinder damping the movement of the weight relatively to the casing or cylinder as the cable moves. While a construction of this type can be relatively effective, it is quite costly because it requires an enclosing cylinder or casing that must be assembled about a weight, with the further complication of fluid and a spring within the casing. Furthermore, it is extremely difficult to form the casing so that it will accept weights of different size, as may frequently required because of varying conditions. In addition, the weights themselves are relatively costly and their mounting and control difficult to achieve.

In other prior art constructions, no fluid is utilized between the weight mass and the member that is secured to the cable and supports the weight mass through the intermediary of a spring. It is therefore possible to manufacture a relatively crude and inexpensive device with all elements exposed. However, the absence of the fluid, and the relatively considerable friction that is inherent in these prior art structures because of exposure of the elements, makes them undesirable.

SUMMARY OF INVENTION AND ITS CONTRIBUTION TO THE ART

As a feature of my invention, I use a weight mass that actually forms the outer body of the damper assembly. Further, unlike the prior art, my weight mass has an interior opening that forms the cylinder of the dashpot of my vibration damper, and is adapted to contain fluid whereby the motion of the weight mass relatively to the transmission line cable is effectively damped. As an additional feature the weight mass is readily supported by the cable through the intermediary of a spring as is required in devices of the particular class, the spring being housed in the interior opening of the weight mass.

As a further important feature of the invention, the weight mass may be formed as a concrete casting, obviously therefore contributing an extremely inexpensive but effective construction. In a preferred form of the invention the interior opening of the concrete weight mass houses a piston and spring with the piston supporting the concrete mass through the intermediary of the spring. A piston rod extending from the piston is effectively guided and is secured to the cable.

Further, while my construction is not hermetically sealed, extremely effective sealing means can be developed for the piston rod so as to shield the interior chamber of the weight mass and the fluid and spring contained therein.

In a modified form of my invention, I prefer to use a dashpot subassembly embodying a cylinder and piston, with the cylinder containing the fluid that is required for a construction of the particular class, and with a spring extending between the piston and one end of the cylinder. Further, suitable sealing means are used for the piston rod secured to the piston, the rod itself extending outwardly of the cylinder and fastened at its upper end to the transmission line cable.

As a further important feature, the weight mass opening is so shaped that the entire dashpot subassembly including the piston, spring and cylinder may be moved endwise into the opening and against a suitable shoulder, for full and effective assembly to the concrete weight mass.

It will be obvious to those skilled in the art, that because I use a cylinder that is functionally integral with a cast weight mass, the cylinder chamber is readily changeable in size, while the weight mass is easily varied during the casting of the weight mass. I am able, also, as will appear clearly presently, to obtain a relatively effective sealing of the dashpot cylinder within which the fluid is contained, utilizing for this purpose the piston rod through which the weight mass is supported by the cable.

As a still further detailed feature of my invention, I contribute a construction in which the weight mass is supported by the piston rod in a vertical position, with the piston rod hanging vertically from the conductor. In this manner, the weight mass can function effectively in its movement relatively to the piston rod in all positions of the cable.

DESCRIPTION OF DRAWINGS

Referring now to the drawings.

DESCRIPTION OF PREFERRED FORM OF INVENTION

Figure 1:
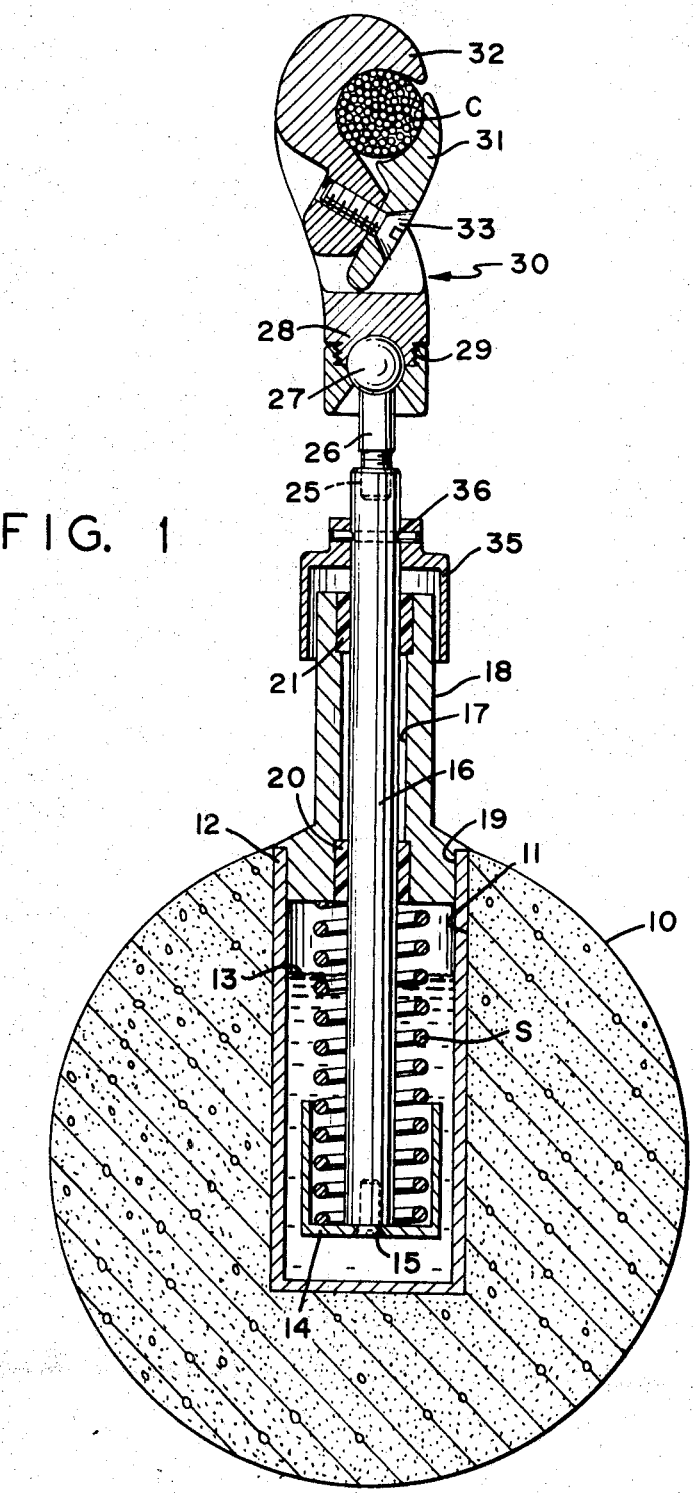
FIG. 1 is a vertical section illustrating one form of my invention secured to a cable conductor which is also shown in section.

Referring now to FIG. 1, the weight mass of my vibration damper is designated by reference numeral 10, and is a concrete casting. A cylindrical opening 11 is formed in the concrete mass when it is cast, and the cylinder and piston rod forming the dashpot of my invention are adapted to be inserted into the opening 11 and suitable secured therein as by adhesive. The fluid containing cylinder of my dashpot is itself designated by reference numeral 12. It can be a one piece drawn metal elongated cup, and is adapted to have contained therein a damping fluid 13, the upper level of which is shown in FIG. 1. The fluid is preferably a silicon oil.

The piston of the dashpot of my invention is designated by reference numeral 14, and is secured at 15 to a piston rod 16, that extends upwardly through a bore 17 in a bearing sleeve 18. The sleeve 18 is suitably secured to cylinder 11 at 19 by a forced fit, adhesive, or in any other suitable manner so as to become an integral part thereof.

Spaced nylon or similar bearings 20 and 21 are fixed in the bore 17, and the rod 16 slides relatively to these bearings. The bearings 20 and 21 not only permit effective movement between the sleeve 18 and the rod 16, but act also to inhibit to a degree the entry of dirt, rain, ice, etc. downwardly through the bore 17 into the cylinder 11.

The upper end of the rod 16 is suitable secured through screw threads 25 to a short rod 26, the upper end of which is formed as a ball 27 whereby it may be mounted for universal movement relatively to a bearing 28. Bearing 28 is preferably formed of two parts held together by suitable screw threads 29. This type of universal mounting per se is quite well known in many arts. The universal mounting for the ball 27 is carried by a suitable securing member 30, having a pair of jaws 31 and 32 adapted to be brought together by a screw 33 relatively to a cable C. The cable C is obviously a transmission line cable, the oscillations of which are to be damped.

Mounted within the cylinder 12, and bearing at one end against the bottom of sleeve 18, is a spring S. The opposite end of the spring S bears against the end of the piston 14, the spring itself being mounted about the rod 16 so as to be effectively guided and held in position. Preferably also, the piston 14 is skirted and therefore helps contain the spring S.

It is thought that those skilled in the art will now readily appreciate the contribution of this form of my invention. Thus, it is obvious that the piston rod 17 will hang vertically in all positions of the cable C. It is further obvious, that any upward and downward movement of the piston rod 16 with the cable C will be damped by the weight mass 10 which is supported by the rod 16 through the intermediary of the spring S. It will also be well appreciated that the silicon oil 13 will effectively help dampen motion between the weight 10 and the rod 16. I will not venture into a description of the theory of the damper, as this is quite well-known in the art.

It will be well to emphasize that in the construction illustrated, the shape of the weight mass may easily be changed and its weight may be increased effectively and without difficult, and without appreciable expense. Further, it will be appreciated that the cylinder 12 may readily be assembled within the opening 11 of mass 10 without complicated assembly means. As a matter of fact, the cylinder 12 may be secured within the mass 10 when the mass is cast. For that purpose, the outside surface of the cylinder 12 may be formed with suitable protuberances or roughed so that effective assembly of the cylinder to the mass 10 is accomplished incidental to the casting operation.

It will also now be appreciated, that the piston rod 16 is effectively supported relatively to the sleeve 18, and that relatively effective sealing of the cylinder will be obtained through means of the bearings 20 and 21.

As a further effective sealing means, I may employ the inverted cup shaped device 35 pinned to the piston rod 16 at 36, and fitted over the upper end of the sleeve 18. Obviously, the inverted cup 35 will rather effectively seal the upper bearing 21, and will further assist in preventing the movement of water or dirt into the dashpot assembly.

Figure 2:
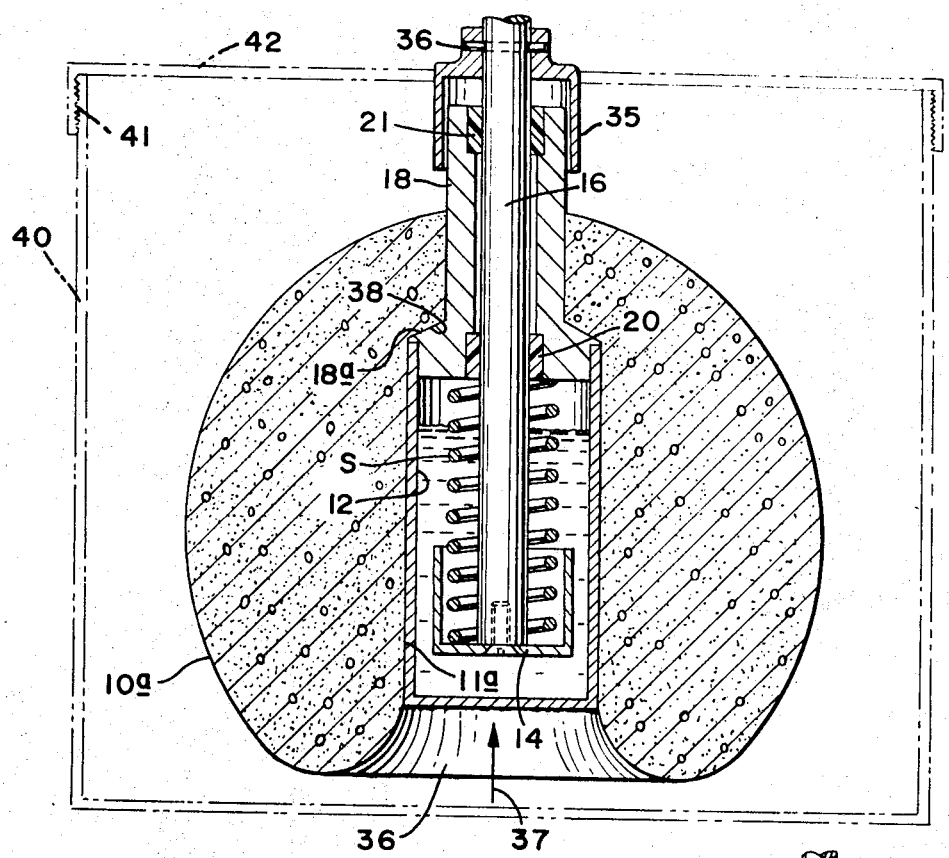
FIG. 2 is a section similar to FIG. 1, but showing only a part of the assembly of FIG. 1, with the weight mass constructed in accordance with another concept of my invention.

In the modification of FIG. 2, the weight mass is designated by reference numeral 10a, and is substantially the same as the weight mass 10, except that its internal opening 11a is formed differently, and is open at its bottom, as designated by reference numeral 36. The dashpot assembly illustrated in FIG. 2 is exactly the same as that of FIG. 1. Because of the open bottom 36, it is possible to insert the dashpot assembly upwardly into the opening 11a in the direction of the arrow 37. The upper end of the opening 11a is made the same diameter as the sleeve 18, there being a shoulder 38 between the relatively larger and smaller parts of the opening. Obviously, the surface 18a of the sleeve 18 abuts shoulder 38 and limits the upward movement of the cylinder and piston assembly into the opening 11a of the weight mass 10a. Also, it is obvious in FIG. 2, that the weight mass 10a cannot move downwardly relatively to the cylinder assembly, because its part 38 will be held against such downward movement by the surface 18a of the sleeve 18.

Of course, the covering inverted cup 35 in FIG. 2 will not be applied to the piston rod 16 until after the piston rod and the cylinder have been placed in the opening 11a, all as those skilled in the art will appreciate. Instead of using the inverted cup 35, it is possible to use, in the construction of FIG. 2, and also in the construction of FIG. 1, a covering casing such as illustrated in phantom in FIG. 2. Thus, I may have a casing having a bottom portion 40 threaded at 41 for assembly to a cap 42. The cap 42 can itself be pinned, as by the same pin 36 utilized in connection with the inverted sleeve 35, to the piston rod 16. It is merely necessary to make the casing 40, 41, 42 sufficiently large to allow necessary movement of the weight mass 10a relatively to the piston rod 16.

This casing construction will be used only for special purposes. Actually, the disclosure of this casing illustrates the considerable advantages of my invention, inherent in the use of the piston rod 16, the upper and lower bearings 20 and 21, and the inverted cup 35, for sealing the fluid containing chamber of the cylinder 12.

Figure 3:
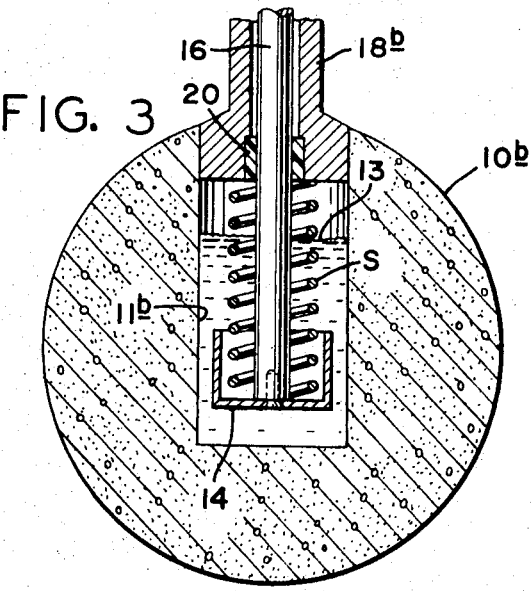
FIG. 3 is a section similar to FIG. 2 but illustrating a modification of my invention in which the concrete mass itself forms the dashpot cylinder.

Referring now to FIG. 3, I show there sleeve 18b secured directly to the concrete weight mass, designated by reference numeral 10b. Sleeve 18b is substantially identical with sleeve 18 of FIG. 1, except that it is secured directly to the concrete. The construction of FIG. 3 will function exactly the same as the construction of FIG. 1, except that the piston 14, the spring S and the fluid will be housed within opening 11b formed in the concrete body 10b, eliminating the cylindrical member 12, required in the constructions of FIGS. 1 and 2.

Figure 4:
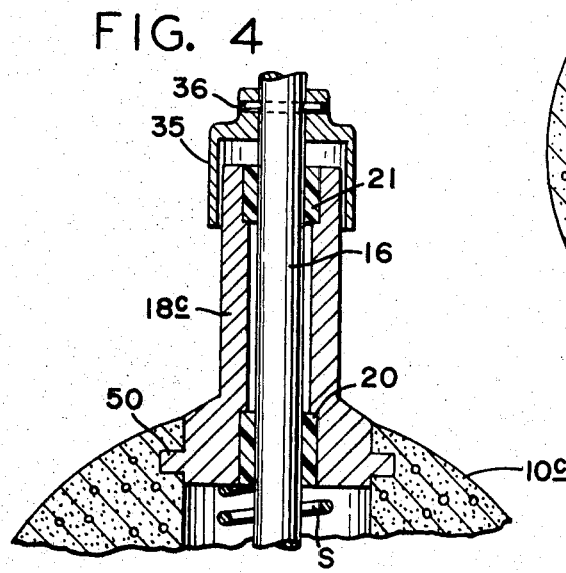
FIG. 4 is a further modification similar to that of FIG. 3 showing a different form of securing means for the sleeve bearing utilized in my invention.

In FIG. 4 I show substantially the same construction as that of FIG. 3, except that the sleeve here is designated by reference numeral 18c. Its lower portion is formed with a series of protuberances 50 that lie in corresponding openings in the weight mass 10c. The weight mass is preferably cast about the sleeve 18c and relatively to the protuberances 50 so as to form, in effect, an integral assembly with sleeve 18c. It is obvious that in the modifications of FIGS. 3 and 4, it is again possible to utilize weight masses of various sizes and shapes, with varying types of springs S. It is also well to note that in all my modifications the weight mass is shaped to minimize corona.

I do believe that the nature of my invention and its contribution to the art will now be clearly understood.

I claim:

1. In a combination of the class described, a weight mass; a cylinder located bodily within said weight mass; a piston slidable in said cylinder; a fluid within said cylinder for damping sliding movement of the piston relative thereto; said cylinder having a closed end and an opposed sleeve end with a bore therethrough; a spring pressing said piston toward said closed end of said cylinder, and reacting against said sleeve end; a piston rod secured at one end thereof to said piston and having the other end thereof extending through the bore in said sleeve end outwardly of said cylinder and said weight mass; wherein said weight mass is adapted to move downwardly relative to the piston against the pressure of said spring when the piston is held in a position to support the cylinder and weight mass through the intermediary of said spring.

2. In the combination of claim 1, the feature that said weight mass includes a through opening into which the cylinder may be inserted from one end of the opening.

3. In the combination of claim 1, means coupled to the end of said piston rod which extends outwardly of said cylinder and said weight mass, securing said rod to a conductor.

4. In combination of claim 1, the feature that said weight mass is a casting.

5. In the combination of claim 1, the feature that said casting is concrete or the like.

6. In the combination of claim 1, the feature that the other end of said piston rod is secured to a line cable and holds said piston in said position to support the weight mass through the intermediary of said spring.

7. In the combination of claim 1, the feature that said cylinder has a relatively large lower part forming the chamber in which said piston slides, and a relatively smaller upper sleeve part through which extends a piston rod secured at one end to the piston, and said opening in the weight mass being formed as a through opening so that said cylinder is insertable bodily into one end of the through opening with its sleeve part entering a relatively small portion of said opening as said relatively larger lower part enters a relatively larger portion of said opening, whereupon the cylinder member and weight mass are in stop relation relatively to one another so that the cylinder may support the weight mass.

8. In the combination of claim 1, the feature that said cylinder sleeve part extends outwardly of said weight mass, and a covering device fixed to said piston rod and sliding about said cylinder sleeve to shield the bore thereof.

9. In the combination of claim 7, the feature that said cylinder sleeve part extends outwardly of said weight mass, and a covering device fixed to said piston rod and sliding about said cylinder sleeve to shield the bore thereof.

10. In the combination of claim 1, the feature that said spring is a compression spring pressing at one end against said piston and at the other end thereof against said sleeve.

11. In the combination of claim 2, the feature that said opening and cylinder are shaped so that said cylinder strikes a stop surface as it is inserted into the opening.

12. In the combination of claim 3, the feature that the means securing the piston rod to the conductor allows relatively universal movement of said rod relatively to the conductor to a degree which will permit the rod to assume a vertical position in all attitudes of said conductor.